US007936750B2

(12) United States Patent
Tsuzuki et al.

(10) Patent No.: US 7,936,750 B2
(45) Date of Patent: May 3, 2011

(54) PACKET TRANSFER DEVICE AND COMMUNICATION SYSTEM

(75) Inventors: Akihito Tsuzuki, Yokohama (JP); Hiroaki Miyata, Yokohama (JP); Yasuo Kogure, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 11/734,354

(22) Filed: Apr. 12, 2007

(65) Prior Publication Data

US 2008/0013534 A1 Jan. 17, 2008

(30) Foreign Application Priority Data

Jul. 14, 2006 (JP) ................................. 2006-193543

(51) Int. Cl.
*H04L 12/28* (2006.01)

(52) U.S. Cl. ....................................................... 370/389

(58) Field of Classification Search .................. 370/356, 370/389; 709/213–238
See application file for complete search history.

(56) References Cited

U.S. PATENT DOCUMENTS

| | | | | |
|---|---|---|---|---|
| 6,172,991 | B1 * | 1/2001 | Mori | 370/474 |
| 6,574,240 | B1 * | 6/2003 | Tzeng | 370/469 |
| 7,020,707 | B2 * | 3/2006 | Sternagle | 709/230 |
| 7,185,094 | B2 * | 2/2007 | Marquette et al. | 709/225 |
| 7,283,519 | B2 * | 10/2007 | Girard | 370/353 |
| 2004/0125923 | A1 * | 7/2004 | See et al. | 379/88.17 |
| 2006/0036733 | A1 * | 2/2006 | Fujimoto et al. | 709/225 |
| 2006/0274768 | A1 * | 12/2006 | Suzuki et al. | 370/401 |

FOREIGN PATENT DOCUMENTS

JP 2006-109047 4/2006

OTHER PUBLICATIONS

RFC 2327, W. Handley, et al., "SDP: Session Description Protocol" pp. 1-37, Apr. 1998.
RFC 1889, H. Schulzrinne, et al., "RTP: A Transport Protocol for Real-Time Applications" pp. 1-65, Jan. 1996.
RFC 3261, J. Rosenberg, et al., "SIP: Session Initiation Protocol", pp. 1-232, Jun. 2002.

* cited by examiner

*Primary Examiner* — Ayaz R Sheikh
*Assistant Examiner* — Hai-Chang Hsiung
(74) *Attorney, Agent, or Firm* — Mattingly & Malur, P.C.

(57) ABSTRACT

In a network having an L2SW in which uplink VLAN is set, a transfer delay of a voice call packet is prevented. In a process of establishing a session between terminals (5), a packet transfer device (1) stores information capable of specifying a sending terminal (5-1) and a receiving terminal (5-2) and a correspondence relation (user connection information) to a connection port into a table. A SIP message of a session control packet communicated between the terminals (5) is snooped, and a destination IP address, a transmission source IP address, a destination port number, a transmission source port number, a connection port etc. are stored into the table. In a case where an RTP packet as voice data is received after the session is established, the packet transfer device (1) performs a loopback transfer or transfers it to an uplink port in accordance with the table.

12 Claims, 26 Drawing Sheets

TABLE REGISTRATION (1)

DEVICE MANAGEMENT TABLE (70)

| # | SENDING DEVICE TERMINAL INFORMATION | | | | RECEIVING DEVICE TERMINAL INFORMATION | | |
|---|---|---|---|---|---|---|---|
| | REQUEST SOURCE IDENTIFIER | IP ADDRESS | PORT | DEVICE PORT | IP ADDRESS | PORT | DEVICE PORT |
| 1 | UserB@aaa.com | 100.100.1.1 | 50050 | 1 | | | |
| 2 | | | | | | | |

70A / 70B / EN1

USER CONNECTION MANAGEMENT TABLE (PORT 1) (90-1)

| # | DESTINATION ADDRESS | SOURCE ADDRESS | DESTINATION PORT | SOURCE PORT | OUTPUT PORT | PRIORITY |
|---|---|---|---|---|---|---|
| 1 | any | any | any | any | n | LOW |
| 2 | | | | | | |

EN1

USER CONNECTION MANAGEMENT TABLE (PORT 2) (90-2)

| # | DESTINATION ADDRESS | SOURCE ADDRESS | DESTINATION PORT | SOURCE PORT | OUTPUT PORT | PRIORITY |
|---|---|---|---|---|---|---|
| 1 | any | any | any | any | n | LOW |
| 2 | | | | | | |

TABLE REGISTRATION (2)

DEVICE MANAGEMENT TABLE (70)

| # | SENDING DEVICE TERMINAL INFORMATION (70A) | | | | RECEIVING DEVICE TERMINAL INFORMATION (70B) | | |
|---|---|---|---|---|---|---|---|
| | REQUEST SOURCE IDENTIFIER | IP ADDRESS | PORT | DEVICE PORT | IP ADDRESS | PORT | DEVICE PORT |
| 1 | UserB@aaa.com | 100.100.1.1 | 50050 | 1 | 100.100.1.10 | 50070 | 2 |
| 2 | | | | | | | |

EN1

USER CONNECTION MANAGEMENT TABLE (PORT 1) (90-1)

| # | DESTINATION ADDRESS | SOURCE ADDRESS | DESTINATION PORT | SOURCE PORT | OUTPUT PORT | PRIORITY |
|---|---|---|---|---|---|---|
| 1 | any | any | any | any | n | LOW |
| 2 | 100.100.1.10 | 100.100.1.1 | 50070 | 50050 | 2 | HIGH |

EN1
EN2

USER CONNECTION MANAGEMENT TABLE (PORT 2) (90-2)

| # | DESTINATION ADDRESS | SOURCE ADDRESS | DESTINATION PORT | SOURCE PORT | OUTPUT PORT | PRIORITY |
|---|---|---|---|---|---|---|
| 1 | any | any | any | any | n | LOW |
| 2 | 100.100.1.1 | 100.100.1.10 | 50050 | 50070 | 1 | HIGH |

INVITE PACKET M1

```
DA:138.85.28.1  #SIP SERVER
SA:100.100.1.1  #UserB
UDP dst port:5060
UDP src port:5060
............SIP message............
INVITE sip:UserC@aaa.com SIP/2.0
Via: SIP/2.0/UDP/ userb.aaa.com:5060
From: Laura <SIP:UserB@aaa.com>
To: Bob <SIP:UserC@aaa.com>
Call-ID: 12345678@userb.aaa.com
CSeq: 1 INVITE
Contact:Laura <SIP:UserB@userb.aaa.com>
Content-type: application/sdp
Content-length:

v=0
o=Laura 289123456 289123456 IN IP4 userb.aaa.com
s=Let us talk for while
c=IN IP4 100.100.1.1
t=0 0
m=audio 50050 RTP/AVP 0
```

FIG. 12

INVITE PACKET M4

```
DA: 100.100.1.10  # UserB
SA: 138.85.28.1   #SIP SERVER
UDP dst port: 5060
UDP src port: 5060
··············SIP message···············
INVITE sip:UserC@aaa.com SIP/2.0
Via: SIP/2.0/UDP/ aaa.com
Via: SIP/2.0/UDP/ userb.aaa.com:5060
From: Laura <SIP:UserB@aaa.com>
To: Bob <SIP:UserC@aaa.com>
Call-ID: 12345678@userb.aaa.com
Cseq: 1 INVITE
Contact:Laura <SIP:UserB@userb.aaa.com>
Content-type: application/sdp
Content-length:

v=0
o=Laura 289123456 289123456 IN IP4 userb.aaa.com
s=Let us talk for while
c=IN IP4 100.100.1.1
t=0 0
```

FIG. 13

200 OK PACKET M7

```
DA: 138.85.28.1    #SIP SERVER
SA: 100.100.1.10   #UserC
UDP dst port: 5060
UDP src port: 5060
················SIP message················
SIP/2.0 200 OK
Via:  SIP/2.0/UDP/ aaa.com
Via:  SIP/2.0/UDP/ userb.aaa.com:5060
From:  Laura <SIP:UserB@aaa.com>
To:  Bob <SIP:UserC@aaa.com>
Call-ID:  12345678@userb.aaa.com
Cseq:  1 INVITE
Contact: BOb <SIP:UserC@userc.aaa.com>
Content-type:  application/sdp
Content-length:

v=0
o=Bob 289123456 289123456 IN IP4 userc.aaa.com
s=Let us talk for while
c=IN IP4 100.100.1.10
t=0 0
m=audio 50070 RTP/AVP 0
```

200 OK PACKET M10

```
DA: 100.100.1.1   #UserB
SA: 138.85.28.1   #SIP SERVER
UDP dst port: 5060
UDP src port: 5060
···············SIP message···············
SIP/2.0 200 OK
Via: SIP/2.0/UDP/ userb.aaa.com:5060
From: Laura <SIP:UserB@aaa.com>
To: Bob <SIP:UserC@aaa.com>
Call-ID: 12345678@userb.aaa.com
Cseq: 1 INVITE
Contact: BOb <SIP:UserC@userc.aaa.com>
Content-type: application/sdp
Content-length:

v=0
o=Bob 289123456 289123456 IN IP4 userc.aaa.com
s=Let us talk for while
c=IN IP4 100.100.1.10
t=0 0
m=audio 50070 RTP/AVP 0
```

FIG. 15

ACK PACKET M13

DA: 138.85.28.1   #SIP SERVER
SA: 100.100.1.1   # UserB
UDP dst port: 5060
UDP src port: 5060
················SIP message···············
ACK SIP: UserC@100.100.1.10 SIP/2.0
Via: SIP/2.0/UDP/ userb.aaa.com: 5060
From: Laura <SIP: UserB@aaa.com>
To: Bob <SIP: UserC@aaa.com>
Call-ID: 12345678@userb.aaa.com
Cseq: 1 ACK
Contact: Laura <SIP: UserB@userb.aaa.com>
Content-type: application/sdp
Content-length:

FIG. 16

ACK PACKET M16

```
DA: 100.100.1.10 # UserC
SA: 138.85.28.1   #SIP SERVER
UDP dst port: 5060
UDP src port: 5060
············SIP message············
ACK SIP: UserC@100.100.1.10 SIP/2.0
Via:  SIP/2.0/UDP/ aaa.com
Via:  SIP/2.0/UDP/ userb.aaa.com:5060
From:  Laura <SIP: UserB@aaa.com>
To:  Bob <SIP: UserC@aaa.com>
Call-ID:  12345678@userb.aaa.com
Cseq:  1 ACK
Contact: Laura <SIP: UserB@userb.aaa.com>
Content-type:  application/sdp
Content-length:
```

FIG. 17

RTP PACKET D1

```
DA: 100.100.1.10  # UserC
SA: 100.100.1.1   # UserB
UDP dst port: 50070
UDP src port: 50050
············SIP message············
OMITTED
```

FIG. 18

RTP PACKET D3

```
DA:100.100.1.1      # UserB
SA:100.100.1.10     # UserC
UDP dst port:50050
UDP src port:50070
··············SIP message··············
OMITTED
```

FIG. 19

BYE PACKET M19

```
DA: 138.85.28.1   #SIP SERVER
SA: 100.100.1.1   # UserB
UDP dst port: 5060
UDP src port: 5060
···············SIP message···············
BYE SIP: UserC@100.100.1.10 SIP/2.0
Via:  SIP/2.0/UDP/ userb.aaa.com: 5060
From:  Laura <SIP: UserB@aaa.com>
To:  Bob <SIP: UserC@aaa.com>
Call-ID:  12345678@userb.aaa.com
Cseq:  2 BYE
Contact: Laura <SIP: UserB@userb.aaa.com>
```

FIG. 20

BYE PACKET M22

DA: 100.100.1.10 # UserC
SA: 138.85.28.1   #SIP SERVER
UDP dst port: 5060
UDP src port: 5060
·············SIP message···············
BYE SIP: UserC@100.100.1.10 SIP/2.0
Via: SIP/2.0/UDP/aaa.com
Via: SIP/2.0/UDP/ userb.aaa.com:5060
From: Laura <SIP:UserB@aaa.com>
To: Bob <SIP:UserC@aaa.com>
Call-ID: 12345678@userb.aaa.com
Cseq: 2 BYE
Contact:Laura <SIP:UserB@userb.aaa.com>

FIG. 21

200 OK PACKET M25

```
DA:138.85.28.1   #SIP SERVER
SA:100.100.1.10  #UserC
UDP dst port:5060
UDP src port:5060
···············SIP message···············
SIP/2.0 200 OK
Via: SIP/2.0/UDP/ aaa.com
Via: SIP/2.0/UDP/ userb.aaa.com:5060
From: Laura <SIP:UserB@aaa.com>
To: Bob <SIP:UserC@aaa.com>
Call-ID: 12345678@userb.aaa.com
Cseq: 2 BYE
Contact:BOb <SIP:UserC@userc.aaa.com>
```
202

FIG. 22

200 OK PACKET M28

```
DA: 100.100.1.1    #UserB
SA: 138.85.28.1    #SIP SERVER
UDP dst port: 5060
UDP src port: 5060
·················SIP message···············
SIP/2.0 200 OK
Via: SIP/2.0/UDP/ userb.aaa.com:5060
From: Laura <SIP:UserB@aaa.com>
To: Bob <SIP:UserC@aaa.com>
Call-ID: 12345678@userb.aaa.com
Cseq: 2 BYE
Contact:BOb <SIP:UserC@userc.aaa.com>
```

FIG. 23

1-1
TABLE REGISTRATION (1)

| # | DEVICE MANAGEMENT TABLE 70A ... 70 ... 70B ||||||| |
|---|---|---|---|---|---|---|---|
| | SENDING DEVICE TERMINAL INFORMATION |||| RECEIVING DEVICE TERMINAL INFORMATION |||
| | REQUEST SOURCE IDENTIFIER | IP ADDRESS | PORT | DEVICE PORT | IP ADDRESS | PORT | DEVICE PORT |
| 1 | UserB@aaa.com | 100.100.1.1 | 50050 | 1 | | | |
| 2 | | | | | | | |

EN1

(a)

1-2

| # | DEVICE MANAGEMENT TABLE ||||||| |
|---|---|---|---|---|---|---|---|
| | SENDING DEVICE TERMINAL INFORMATION |||| RECEIVING DEVICE TERMINAL INFORMATION |||
| | REQUEST SOURCE IDENTIFIER | IP ADDRESS | PORT | DEVICE PORT | IP ADDRESS | PORT | DEVICE PORT |
| 1 | | | | | | | |
| 2 | | | | | | | |

TABLE REGISTRATION (1)

| | DEVICE MANAGEMENT TABLE (70) | | | | | | |
|---|---|---|---|---|---|---|---|
| | SENDING DEVICE TERMINAL INFORMATION (70A) | | | | RECEIVING DEVICE TERMINAL INFORMATION (70B) | | |
| # | REQUEST SOURCE IDENTIFIER | IP ADDRESS | PORT | DEVICE PORT | IP ADDRESS | PORT | DEVICE PORT |
| 1 | UserB@aaa.com | 100.100.1.1 | 50050 | 1 | | | |
| 2 | | | | | | | |

EN1

(a)

TABLE REGISTRATION (2)

| | DEVICE MANAGEMENT TABLE (70) | | | | | | |
|---|---|---|---|---|---|---|---|
| | SENDING DEVICE TERMINAL INFORMATION (70A) | | | | RECEIVING DEVICE TERMINAL INFORMATION (70B) | | |
| # | REQUEST SOURCE IDENTIFIER | IP ADDRESS | PORT | DEVICE PORT | IP ADDRESS | PORT | DEVICE PORT |
| 1 | UserB@aaa.com | 100.100.1.1 | 50050 | 1 | 100.100.1.10 | 50070 | 2 |
| 2 | | | | | | | |

EN1

(b)

USER CONNECTION MANAGEMENT TABLE (PORT 1)  90-1

| # | DESTINATION ADDRESS | SOURCE ADDRESS | DESTINATION PORT | SOURCE PORT | OUTPUT PORT | PRIORITY |
|---|---|---|---|---|---|---|
| 1 | any | any | any | any | n | LOW |
| 2 | 100.100.1.10 | 100.100.1.1 | 50070 | 50050 | 2 | HIGH |

EN1
EN2

(c)

USER CONNECTION MANAGEMENT TABLE (PORT 2)  90-2

| # | DESTINATION ADDRESS | SOURCE ADDRESS | DESTINATION PORT | SOURCE PORT | OUTPUT PORT | PRIORITY |
|---|---|---|---|---|---|---|
| 1 | any | any | any | any | n | LOW |
| 2 | 100.100.1.1 | 100.100.1.10 | 50050 | 50070 | 1 | HIGH |

PACKET TRANSFER DEVICE AND COMMUNICATION SYSTEM

BACKGROUND OF THE INVENTION

The present invention relates to a packet transfer device and a communication system, and particularly to a packet transfer device (L2SW) and a communication system effective in reducing a transfer delay time when VOIP communication is performed through a virtual communication channel between SIP device terminals connected to the same packet transfer device in an Ethernet (registered trademark) network.

In recent years, there exists a case where an administrator of an apartment house such as a condominium, of a hotel, or of a multi-tenant building subscribes to a high-speed Internet connection service, and the administrator provides users with the shared Internet connection service which is used in common by the respective users through a LAN such as the Ethernet (registered trademark).

In the shared Internet connection service, it is unnecessary for each user to perform the Internet connection through an ISP and the user can easily use it, however, the connection is performed through the LAN such as the Ethernet (registered trademark), and a broad cast packet from a user terminal is transmitted to all user terminals through the L2SW. Thus, in the L2SW, the uplink VLAN setting of allowing packet transfer to, for example, a specific port (uplink port) connected to the ISP is performed for a port connected to each user terminal, so that the broad cast packet is not transferred to another user (port other than the uplink port), and the layer 2 communication between the ports connecting the users can be prevented. With respect to a packet other than the broad cast packet, the IP packet redirected from the uplink port by the uplink VLAN setting is routed back by an upper router, so that the communication between the users in the same domain is realized.

On the other hand, in the field of an IP telephone, there is known a Voice over IP (VOIP) technique in which voice is transmitted with IP packets. In the VOIP, a virtual communication path (session) is established between the terminals before the start of communication, and an IP packet including voice data is transferred on the communication path. The establishment and disconnection of the session between the terminals is performed in accordance with a session control protocol.

The Internet Engineering Task Force (IETF) specifies, as a session control protocol in IP multimedia communication, Session Initiation Protocol (SIP, see, for example, non-patent document 1: RFC3261) suitable for the VOIP and Real-time Transport Protocol (RTP, see, for example, non-patent document 3: RFC1889). The SIP is an application protocol using a transport mechanism such as Transmission Control Protocol (TCP) or User Datagram Protocol (UDP). Besides, the SIP is a text-base protocol, and a SIP message has a header part to transport request or response information, and a message body in which the session content is described. In the description of the session, for example, Session Description Protocol (SDP, see, for example, non-patent document 2: RFC2327) is applied, and a communication partner is identified by SIP Uniform Resource Identifier (URI). In the VOIP, the RTP is used for transferring encoded voice data.

Operation modes of a SIP server include a Proxy mode in which a session establishment (call setting) request between terminals is mediated by the SIP server, and a Redirect mode in which a sending terminal acquires information of a receiving terminal from the SIP server and directly communicates with the receiving terminal.

SUMMARY OF THE INVENTION

In the case where a voice call is realized on an IP network such as the Internet or intranet, voice is converted into IP packets and is transferred onto the IP network. In the IP network, many users share, and there are many RTP packets and non-RTP packets. When the network is uncrowded, there is no inconvenience, however, at the busy hour, there is a case where a delay occurs by interruption of another packet. Besides, in a network having a multistage structure of L2SWs for each of which the uplink VLAN is set, as the number of devices to relay IP packets increases, the transfer delay would increase, and the voice delay would occur.

In view of the above, the invention has an object to provide a packet transfer device in which a transfer delay of voice data is prevented in a case where a voice call is performed between terminal devices connected to a packet transfer device for which uplink VLAN setting is performed in the same domain. Besides, the invention has another object to prevent quality deterioration due to the transfer delay of voice data. The invention has another object to satisfy both of security securement by application of uplink VLAN and reduction in transfer delay.

The invention has another object in which in an establishment process of a session, a correspondence relation between information capable of specifying terminal devices from a SIP message and a connection port is registered in a table, and between the terminal devices connected to the same packet transfer device, RTP communication through a loopback virtual communication path by the packet transfer device is enabled. Besides, the invention has another object to reduce a packet transfer delay time. Besides, the invention has another object in which priorities of different protocols are registered in a table and transfer in which priority is given to RTP communication is enabled.

In order to achieve the above objects, this packet transfer device includes a device management table which stores, in a process of establishing a session between SIP device terminals connected to the same packet transfer device, a correspondence relation between information (identification information) capable of specifying a sending SIP device terminal and an receiving SIP device terminal and a connection port and a user connection management table. In a case where an RTP packet as voice data is received after session establishment, a loopback transfer by the packet transfer device is performed in accordance with the table.

The packet transfer device snoops a SIP message of a session control packet communicated between SIP device terminals (SIP snooping), and stores information to specify the SIP device terminal, for example, a destination IP address, a transmission source IP address, a destination port number, a transmission source port number, and a correspondence relation to a connection port into a device management table and a user connection management table.

After the session establishment, the destination IP address, the transmission source IP address, the destination port number, and the transmission source port number are checked from header information of the RTP packet received from the sending SIP device terminal and the receiving SIP device terminal and user connection information of the user connection management table stored in the session connection process, and the RTP packet inconsistent with the user connection information is transferred to the uplink port, and with respect to the RTP packet consistent with the user connection information, the loopback transfer is performed.

The packet transfer device includes, for example, a line interface including plural access side connection ports containing user terminals having plural IP telephone and data communication functions and an ISP side connection port containing a GW device installed at an ISP side, a protocol control unit to perform a transfer processing to the ISP side connection port while all packets received from the access side connection ports are specified, and a monitor processing of a session control packet, a processor and a control unit to manage a memory storing a communication processing program and various management tables such as a device management table and a user connection management table. The packet transfer device monitors the session control packet from the SIP device terminal contained in the access side connection port, and when receiving a session establishment request packet from the sending SIP device terminal to the receiving SIP device terminal as a communication terminal, the packet transfer device registers information capable of specifying the sending SIP device terminal and the receiving SIP device terminal into the device management table from a message in the session establishment request packet. Besides, in the case where a session establishment response packet from the receiving SIP device terminal is received, the device management table is searched based on the information capable of specifying the sending SIP device terminal and the receiving SIP device terminal from a message in the session establishment response packet, and in the case of coincidence, the correspondence relation of the sending SIP device terminal or the receiving SIP device terminal is registered in the device management table. After the session between the sending SIP device terminals or the receiving SIP device terminals is established, the correspondence relation information is registered in each of the user connection management tables managed for the respective access side connection ports containing the sending or receiving SIP device terminals. At the time of reception of a packet from the access side connection port, the user connection management table is searched based on the identification information of the received packet, and in the case of inconsistency, a transfer to the ISP side connection port is performed, and on the other hand, in the case of coincidence, the received packet transfer is performed in accordance with the output port information of the connection destination, so that a transfer delay time between the sending SIP device terminal and the receiving SIP device terminal is reduced.

According to the first solving means of this invention, there is provided a packet transfer device in a communication system including the first packet transfer device and a second packet transfer device to perform routing of a packet between the first packet transfer device and a server or a network, in which the first packet transfer device transfers a packet inputted from a first port for communicating with a first terminal and/or a second port for communicating with a second terminal to a third port for communicating with the second packet transfer device, the second packet transfer device receives the packet and returns the packet to the first packet transfer device, the first packet transfer device transfers the packet from the second packet transfer device in accordance with destination information, and communication between the first terminal and the second terminal is realized, the packet transfer device comprising:

a device management table to correspondingly store sending terminal information including identification information of the first terminal and identification information of the first port, and receiving terminal information including identification information of the second terminal and identification information of the second port;

a connection management table to store output port information corresponding to transmission source information and transmission destination information of a packet; and a processing unit, wherein the processing unit registers, in a case where a session establishment request from the first terminal is received through the first port, the identification information of the first terminal in the session establishment request packet and the identification information of the first port into the sending terminal information of the device management table, registers, in a case where a response packet to the session establishment request packet is received from the second terminal through the second port, the identification information of the second terminal in the response packet and the identification information of the second port into the receiving terminal information of the device management table correspondingly to the sending terminal information, registers into the connection management table the identification information of the first terminal registered in the device management table as transmission source information, the identification information of the second terminal as transmission destination information, and the second port information as output destination port information, registers into the connection management table the identification information of the second terminal registered in the device management table as transmission source information, the identification information of the first terminal as transmission destination information, and the first port information as output destination port information, and searches, when a packet is received from the first or the second port, the connection management table based on transmission source information and transmission destination information of the received packet, and transfers the received packet through the second or the first port in accordance with corresponding output port information.

According to the second solving means of this invention, there is provided a communication system comprising a plurality of the packet transfer devices described above, wherein the respective packet transfer devices are connected in a multistage configuration, and at least one of the plural packet transfer devices is connected to the second packet transfer device.

According to the invention, it can provide a packet transfer device in which a transfer delay of voice data is prevented in a case where a voice call is performed between terminal devices connected to a packet transfer device for which uplink VLAN setting is performed in the same domain. Besides, according to the invention, it can prevent quality deterioration due to the transfer delay of voice data. According to the invention, it can satisfy both of security securement by application of uplink VLAN and reduction in transfer delay.

According to the invention, in which in an establishment process of a session, a correspondence relation between information capable of specifying terminal devices from a SIP message and a connection port is registered in a table, and between the terminal devices connected to the same packet transfer device, RTP communication through a loopback virtual communication path by the packet transfer device is enabled. Besides, according to the invention, it can reduce a packet transfer delay time. Besides, according to the invention, in which priorities of different protocols are registered in a table and transfer in which priority is given to RTP communication is enabled.

BRIEF DESCRIPTION OF THE DRAWINGS

FIG. 8 is a view (FIG. 5: table registration 1) showing the content of a device management table 70 and a user connection management table 90 provided in the packet transfer device of the embodiment.

FIG. 9 is a view (FIG. 5: table registration 2) showing the content of the device management table 70 and the user connection management table 90 provided in the packet transfer device of the embodiment.

FIG. 12 is a view showing an example of an INVITE packet M1 in FIG. 5.

FIG. 13 is a view showing an example of an INVITE packet M4 in FIG. 5.

FIG. 14 is a view showing an example of a 200 OK packet M7 in FIG. 5.

FIG. 15 is a view showing an example of a 200 OK packet M10 in FIG. 5.

FIG. 16 is a view showing an example of an ACK packet M13 in FIG. 5.

FIG. 17 is a view showing an example of an ACK packet M16 in FIG. 5.

FIG. 18 is a view showing an example of an RTP packet D1 in FIG. 6.

FIG. 19 is a view showing an example of an RTP packet D3 in FIG. 6.

FIG. 20 is a view showing an example of a BYE packet M19 in FIG. 7.

FIG. 21 is a view showing an example of a BYE packet M22 in FIG. 7.

FIG. 22 is a view showing an example of a 200 OK packet M25 in FIG. 7.

FIG. 23 is a view showing an example of a 200 OK packet M28 in FIG. 7.

FIGS. 24A and 24B are views showing an example 1 of the device management table 70 and the user connection management table 90 in each of multistage-connected packet transfer devices.

FIGS. 25A to 25D are views showing an example 2 of the device management table 70 and the user connection management table 90 in each of the multistage-connected packet transfer devices.

DESCRIPTION OF THE PREFERRED EMBODIMENTS OF THE INVENTION

Figure 1:
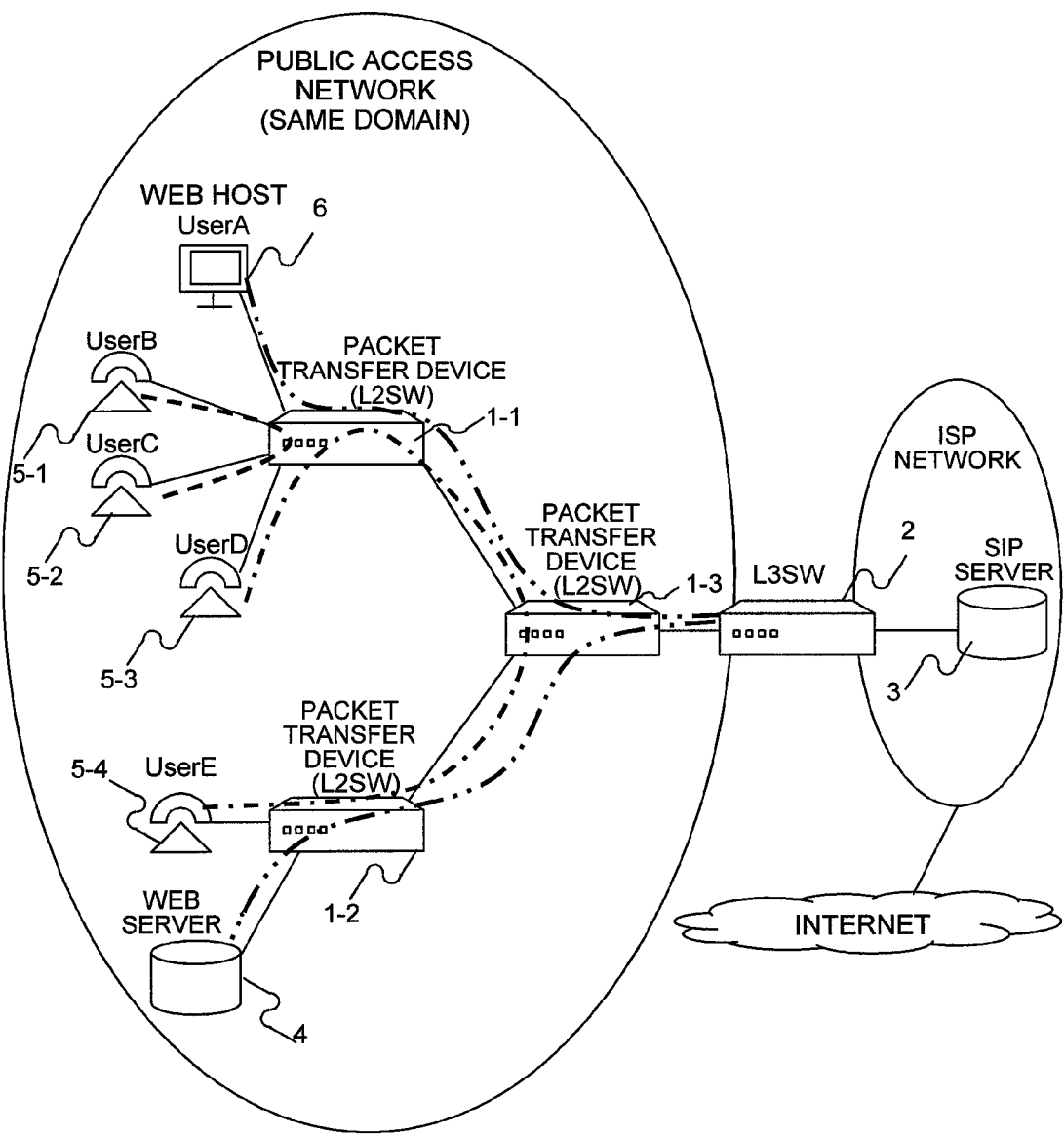
FIG. 1 is a structural view of a communication system of an embodiment.

FIG. 1 is a structural view of a communication system of an embodiment. This communication system includes a packet transfer device (first packet transfer device) 1, an L3SW (Layer 3 switch, second packet transfer device) 2, a SIP server 3, and a SIP device terminal 5. Besides, this communication system may further include a WEB server 4 and a WEB host 6.

In FIG. 1, the packet transfer device 1 has an after-mentioned SIP snooping function, and constructs a wide area L2 switch network (public access network). The public access network includes the WEB host 6, the SIP device terminals (5-1, 5-2, 5-3 and 5-4) and the WEB sever 4. In order for the SIP device terminal 5 connected to the public access network to access the SIP server 3 included in the ISP network, the L3SW 2 is connected between the public access network and the ISP network. An example of communication between the respective terminal devices shown in FIG. 1 will be described below.

For example, in the case where the WEB host 6 communicates with the WEB server 4, a packet is transferred up to the L3SW 2 by uplink VLAN setting of the packet transfer devices 1-1 and 1-3. The packet is routed back by the L3SW 2 and is transmitted to the WEB sever 4 through the packet transfer devices 1-3 and 1-2, so that the communication becomes possible between the WEB host 6 and the WEB server 4.

For example, in the case where VOIP communication is performed between the SIP device terminal 5-1 having an identification name "UserB" and the SIP device terminal 5-2 having an identification name "User C", in a general system in which uplink VLAN is set, a packet from the UserB is transferred up to the L3SW 2, is routed back by the L3SW 2, and is received by the User C. In this embodiment, by the packet transfer device 1-1 having a SIP snooping function, with respect to RTP communication after a session is established between terminal devices, the communication by a loopback transfer by the packet transfer device 1-1 becomes possible.

For example, in the case where VOIP communication across the L2SW is performed between the SIP device terminal 5-3 having an identification name "User D" and the SIP device terminal 5-4 having an identification name "User E", in this embodiment, by the packet transfer device 1-3 having the SIP snooping function, with respect to RTP communication after a session is established between the terminal devices, the communication by a loopback transfer by the packet transfer device 1-3 becomes possible.

Figure 2:
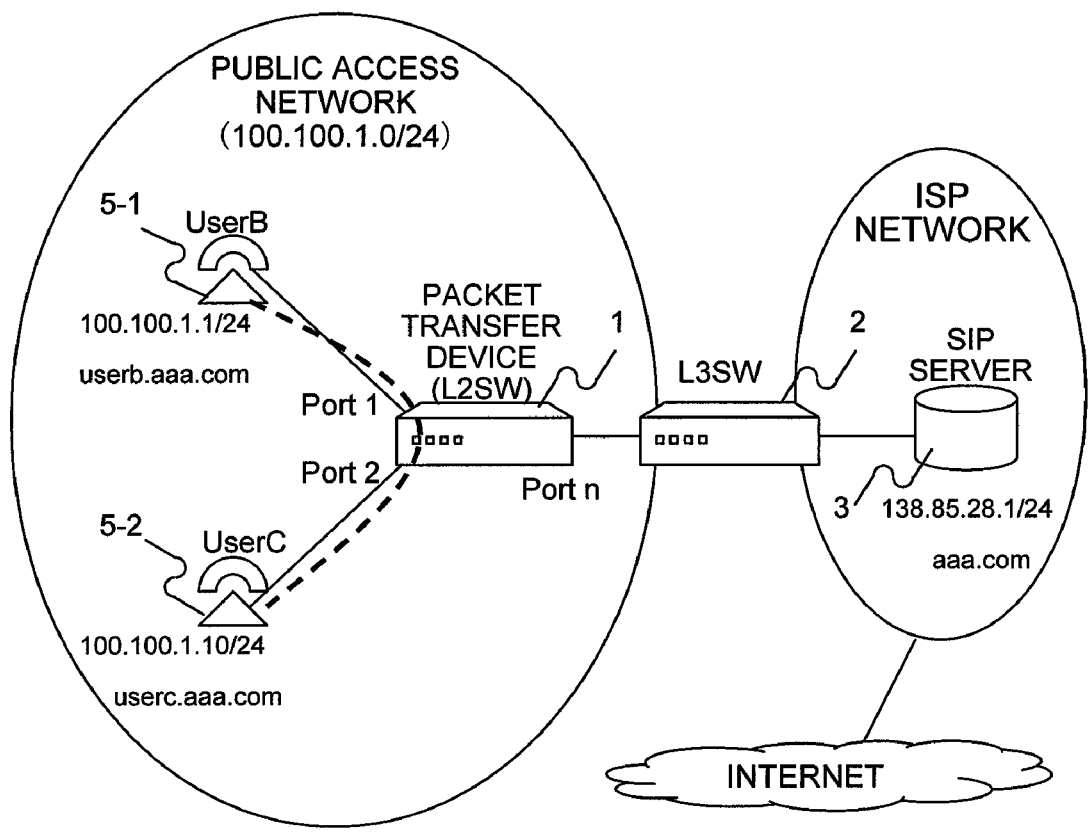
FIG. 2 is a view showing an example of a communication network to which a packet transfer device of an embodiment is applied.

FIG. 2 is a view showing an example of a communication network to which the packet transfer device is applied. FIG. 2 is also a view showing the simplified structure of FIG. 1.

In the structure of FIG. 2, the operation of the packet transfer device 1 of this embodiment will be described while using, as an example, a case in which a session is established through the packet transfer device 1, the L3SW 2 and the SIP server 3 between the SIP device terminal 5-1 having the identification name "User B" and the SIP device terminal 5-2 having the identification name "User C" which are included in the public access network, and the VOIP communication is performed.

In this example, the IP address and URI (Uniform Resource Identifier) of the SIP device terminal (first terminal) 5-1 as the sending side are respectively made, for example, "100.100.1.1" and "userb.aaa.com". Besides, the IP address and URI of the SIP device terminal (second terminal) 5-2 as the receiving side are respectivelymade, for example, "100.100.1.10" and "userc.aaa.com". The IP address and URI of the SIP server 3 included in the ISP network are made, for example, "138.85.28.1" and "aaa.com". Besides, the SIP device terminal 5-1 of the UserB is connected to a port 1 (first port) of the packet transfer device 1, the SIP device terminal 5-2 of the UserC is connected to a port 2 (second port), and the L3SW 2 is connected to a port n (third port). Incidentally, each port may be connected through another packet transfer device to the terminal, the L3SW or the like in addition to the direct connection thereto.

Figure 3:
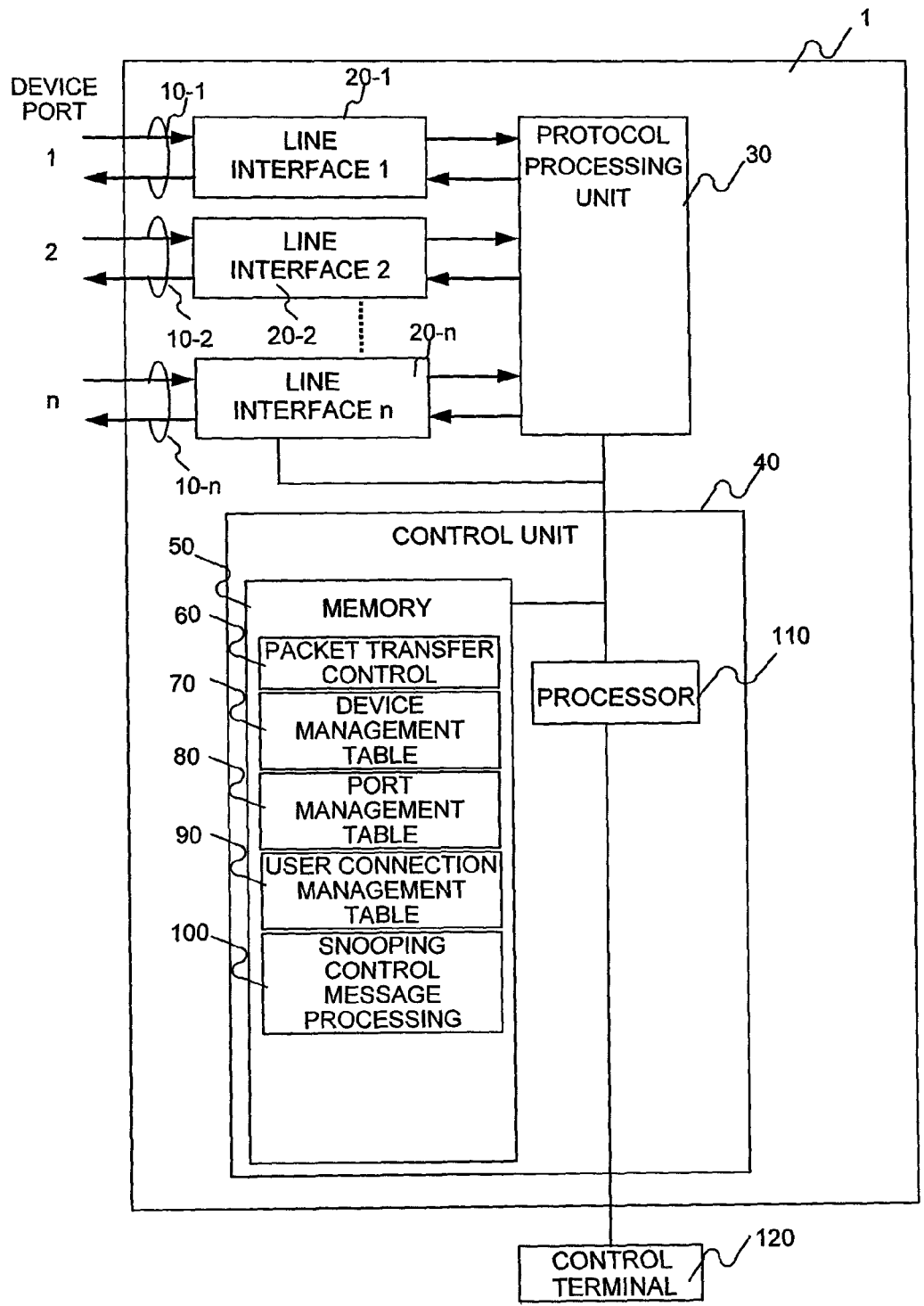
FIG. 3 is a view showing a structure of the packet transfer device of the embodiment.

FIG. 3 is a block diagram showing an example of a structure of the packet transfer device 1.

The packet transfer device 1 includes line interfaces 20-1 to 20-n (n is a natural number) of plural input/output lines, input/output lines 10-1 to 10-n (n is a natural number), a protocol processing unit 30, and a control unit 40 to control them. Besides, control by a control terminal 120 is also made possible. The input/output lines 10-1 to 10-n are given plural port numbers.

The control unit 120 includes a memory 50 storing processing programs 60 and 100 and tables 70, 80 and 90, and a processor (processing unit) 110 to execute the processing programs 60 and 100. The memory 50 includes the packet transfer control 60 and the snooping control message processing 100 as the processing programs to be executed by the processor 110. The packet transfer control 60 analyzes a received packet from the line interface 20, and transfers the packet to the output port in accordance with the port management table 80 to manage MAC addresses and the user connection management table 90 to perform storage in port units. In the case where a received packet from the line interface 20 includes a SIP message for session control between the SIP device terminals 5, the snooping control message processing 100 snoops an IP address and a port number to specify the SIP device terminal 5 from a SIP payload, and handles the device management table 70 and the user connection management table 90 for managing these.

One of features of this embodiment is that when an RTP packet is received from the line interface 20, the packet transfer device 1 can loopback transfer the RTP packet in accordance with the user connection management table 90 in which the IP address to specify the SIP device terminal 5 is made to correspond to the port number in the session connection process. On the other hand, for example, a packet from a terminal for which a session is not established is transferred to an uplink in accordance with the uplink VLAN setting, and therefore, for example, it is prevented that a broad cast packet is transferred to another terminal, and the security is secured.

Figure 4:
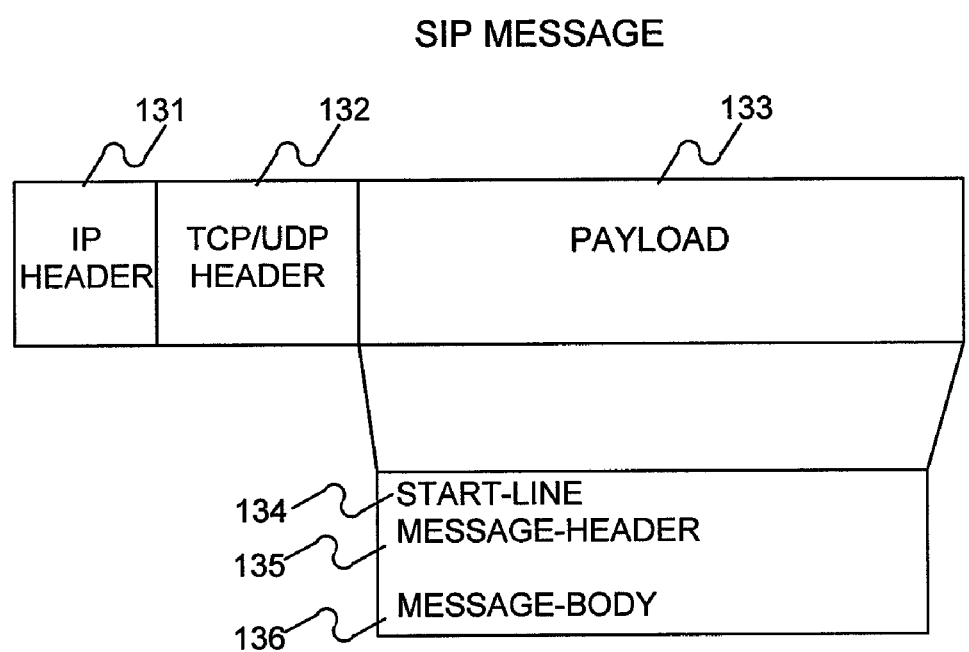
FIG. 4 is a view showing a packet format of a SIP message.

FIG. 4 shows a packet format of a SIP message communicated for establishment and disconnection of a session.

The SIP message is set in an IP header 131, a TCP/UDP header 132, and a payload part 133 of an IP packet. The SIP message includes a start line (Start-line) 134 indicating the kind and destination of the SIP message, a message header (Message-header) 135 including a SIP parameter, and a message body (Message-body) 136 describing information of connection logically formed between terminals. The specific content of the SIP message will be described later with reference to FIG. 12 to FIG. 23 based on the header field prescribed in RFC3261.

FIG. 8 and FIG. 9 are table structural views of the device management table 70 and the user connection management table 90.

As shown in FIG. 8, the device management table 70 includes one or plural entries (EN) each indicating a relation between sending device terminal information 70A and receiving device terminal information 70B. The sending device terminal information includes, for example, a request source identifier, a sending IP address, a port number for data reception, and device port information. The receiving device terminal information includes, for example, a receiving IP address, a port number for data reception, and device port information.

As shown in FIG. 8, the user connection management table 90 includes, for each port, one or plural entries (EN) each indicating correspondence relation among a destination address (Destination Address) for determining an output destination port, a transmission source address (Source Address), a destination port number (Destination Port), a transmission source port number (Source Port), output destination port information, and a priority. FIG. 8 shows table structure examples of the port 1 and the port 2. The priority is for transferring a packet desired to be outputted preferentially by giving priorities to various protocols. It is assumed that the packet transfer device 1 previously fixedly sets the output destination port of all received packets to the uplink port (port n) to which the upper-level L3SW is connected. Incidentally, in this embodiment, although the user connection management table is included for each port, one or a suitable number of tables may be included.

Hereinafter, the operation of the packet transfer device 1 and the like at the time when the VoIP communication is performed between the SIP device terminals 5 included in the public access network will be described with reference to sequence views shown in FIG. 5 to FIG. 7, the device management table 70 and the user connection management table 90 shown in FIG. 8 and FIG. 9.

Figure 5:
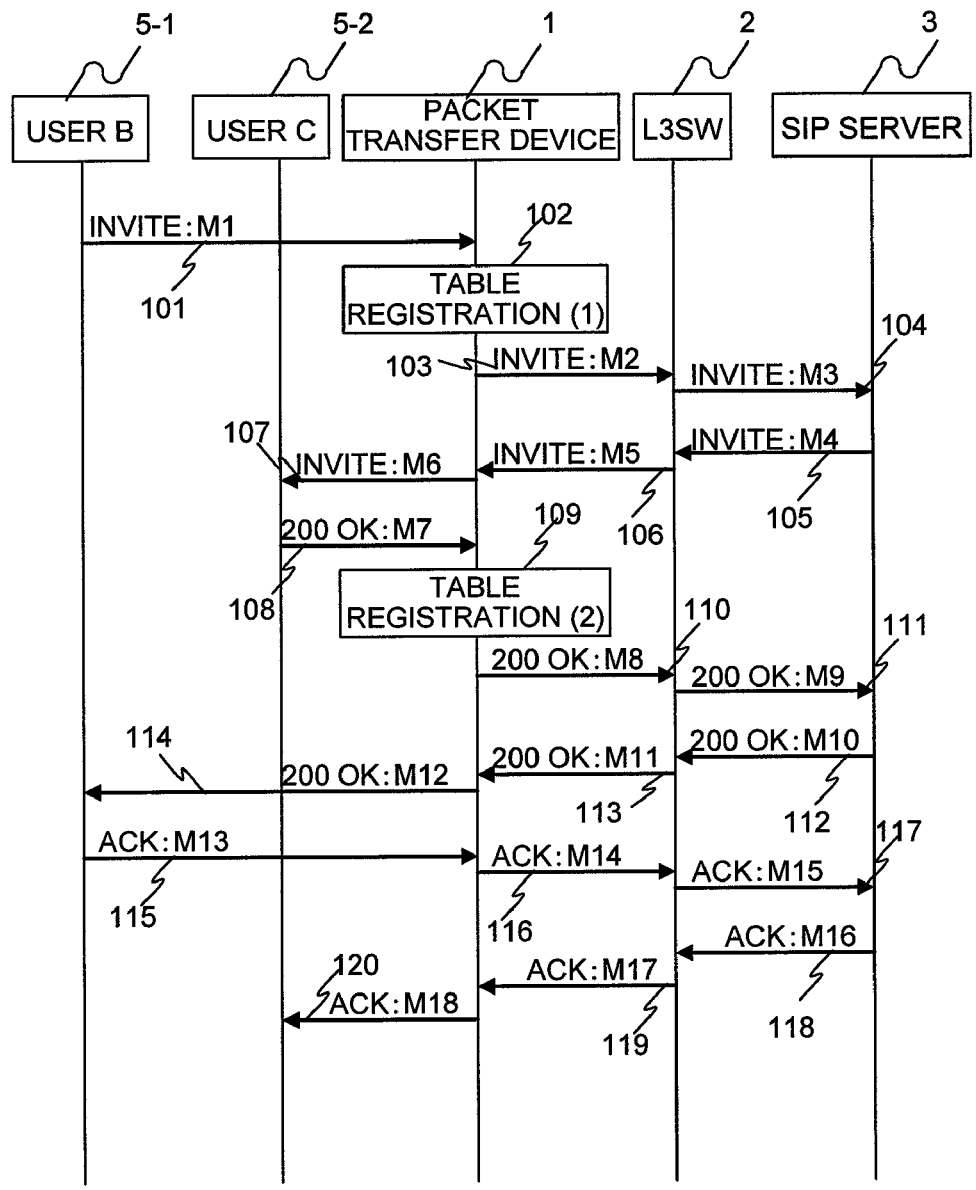
FIG. 5 is a view showing a session establishment sequence between a sending SIP device terminal 5-1 and a receiving SIP device terminal 5-2 in a public access network of FIG. 2.

FIG. 5 is view showing a session establishment sequence between the sending SIP device terminal 5-1 and the receiving SIP device terminal 5-2 in the public access network of FIG. 2. First, the sequence of session establishment and information registration into the table will be described with reference to FIG. 5.

The sending SIP device terminal 5-1 transmits an INVITE packet (session establishment request packet) M1 including a SIP message for session establishment request to the SIP server 3 before the RTP communication to the receiving SIP device terminal 5-2 (101). For example, as shown in FIG. 12, the INVITE packet M1 includes the IP address of the SIP server 3 at a destination address (DA) of the IP header and the IP address of the sending SIP device terminal 5-1 at a transmission source address (SA), and includes a port number "5060" for SIP at the UDP header. Incidentally, in the drawing, a character string subsequent to a # symbol is given for notes.

The SIP message includes a message kind "INVITE" and URI of the receiving SIP device terminal 5-2 at the start line 134. In the message header part 135, the URI and the port number of the sending SIP device terminal 5-1 are specified at a Via header indicating a message path, the destination identifier of the request is specified at a To header, the request source identifier is specified at a From header, and the identifier of the session is specified at a Call-ID. Besides, in the message body 136, the IP address of the sending SIP device terminal 5-1 is specified with a c parameter, and the port number "50050" for data reception in the sending SIP device terminal 5-1 is specified with an m parameter.

The INVITE packet M1 is received in the port 1 of the packet transfer device 1. When receiving the INVITE packet M1, the packet transfer device 1 determines from the value "5060" of the UDP port number that the received packet is for the SIP message. Besides, for example, reference is made to the start line of the SIP message, and it can be determined that the packet is the INVITE packet. Besides, based on the information in the received INVITE packet, the packet transfer device 1 registers information indicating the correspondence relation among the IP address "100.100.1.1" for specifying the sending SIP device terminal 5-1, the port number "50050" for data reception, and the identification information of the packet received device port (port 1) into the device management table 70 (102). The IP address and the port number for data reception can be extracted from, for example, the c parameter and the m parameter. Incidentally, in addition to this, they may be extracted from suitable information in the SIP message. Besides, the packet transfer device 1 may further register the request source identifier from the From header. One of the entries of the device management table 70 becomes, for example, a state shown in FIG. 8. The packet transfer device 1 transfers to the uplink port (port n) in accordance with the user connection management table 90 of the device port (port 1).

When receiving the INVITE packet M2 (103), the L3SW 2 transmits an INVITE packet M3 to the SIP server 3 in accordance with a routing table (104). The structure of the packets M2 and M3 can be made the same as the packet M1. In the description of the embodiment, each packet is denoted by Mx, and also in the following description, a packet transferred by the packet transfer device 1 and the L3SW 2 can be made to have the same structure except that a header and the like are suitably added, changed or deleted.

When receiving the INVITE packet M3, the SIP server 3 specifies the IP address "100.100.1.10" of the receiving SIP device terminal 5-2 by a predetermined database and/or a predetermined processing based on the destination identifier "UserC@aaa.com" indicated by the start line of the SIP message. For example, as shown in FIG. 13, the SIP server 3 adds to the message header a new Via header for adding its own server to the message path, creates an INVITE packet M4 in which the destination address and the transmission source address of the packet M3 are rewritten, and transfers it to the receiving SIP device terminal 5-2 (105). When receiving the INVITE packet M4 (105), the L3SW 2 transmits an INVITE packet M5 to the receiving SIP device terminal 5-2 in accordance with the routing table (106). When receiving the INVITE packet M5 through the port n, the packet transfer device 1 determines the output destination port from the port management table 80 managing the MAC address information, and transfers an INVITE packet M6 to the receiving SIP device terminal 5-2 (107).

When the receiving SIP device terminal 5-2 responds to the incoming call, a 200 OK packet M7 including a SIP response message is transmitted to the SIP server 3 (108). For example, as shown in FIG. 14, the 200 OK packet M7 indicates the message kind "200 OK" at the start line of the SIP message, and includes information similar to the INVITE packet M6 in its message header part. Besides, in the message body, the IP address of the receiving SIP device terminal 5-2 is specified by a c parameter, and the port number "50070" for data reception in the receiving SIP device terminal 5-2 is specified by an m parameter.

The 200 OK packet M7 is received in the port 2 of the packet transfer device 1. When receiving the 200 OK packet M7, the packet transfer device 1 determines from the value "5060" of the UDP port number that the received packet is for the SIP message. Besides, since a Cseq 201 of the SIP message is "INVITE", it is determined that the 200 OK is to the INVITE packet. The packet transfer device 1 snoops (or refers or extracts) the request source identifier indicated by the From header of the message header, and determines whether it coincides with the request source identifier of the sending device terminal information 70A registered in the device management table 70.

In the case of coincidence, for the receiving device terminal information 70B, the packet transfer device 1 extracts the IP address "100.100.1.10" for specifying the receiving SIP device terminal UserC 5-2 and the port number "50070" from the c parameter and the m parameter of the packet M7, makes them correspond to the identification information of the packet received device port (port 2), and registers them in EN1 of the device management table 70 (109). Besides, EN2 is registered in the user connection management table 90-1 of the device port (port 1), and EN2 is registered in the user connection management table 90-2 of the device port (port 2). For example, the EN1 of the device management table 70 becomes a state shown in FIG. 9.

Specifically, the packet transfer device 1 registers the new entry EN2 in the user connection management table 90-1 corresponding to the device port (here, the port 1) of the sending device terminal information stored in the device management table 70. For example, the packet transfer device 1 stores the IP address, the port number and the device port (here, the port 2) of the receiving device terminal information registered in the device management table 70 into the columns of the destination address, the destination port and the output port of the user connection management table 90-1. Besides, the packet transfer device 1 stores the IP address and the port number of the sending device terminal information registered in the device management table 70 into the columns of the transmission source address and the transmission source port of the user connection management table 90-1. The packet transfer device 1 sets the priority of the registered entry to, for example, "high".

Besides, the packet transfer device 1 registers the new entry EN2 in the user connection management table 90-2 corresponding to the device port (here, the port 2) of the receiving device terminal information stored in the device management table 70. The registration is performed such that the destination and the transmission source are reversed to the user connection management table 90-1 so that the packet received from the port 2 is also loopback transferred. For example, the packet transfer device 1 stores the IP address, the port number and the device port (here, the port 1) of the sending device terminal information into the columns of destination address, the destination port and the output port of the user connection management table 90-2. Besides, the packet transfer device 1 stores the IP address and the port number of the receiving device terminal information into the columns of the transmission source address and the transmission source port of the user connection management table 90-2. The packet transfer device 1 sets the priority of the registered entry to, for example, "high".

On the other hand, in the case where the request source identifier indicated by the From header of the message header of the packet M7 does not coincide with the request source identifier of the sending device terminal information 70A registered in the device management table 70, the packet transfer device 1 transfers a 200 OK packet M8 to the uplink port in accordance with the EN1 of the user connection management table 90-1. When receiving the 200 OK packet M8, the L3SW 2 transmits a 200 OK packet M9 to the SIP server 3 in accordance with the routing table (111).

When receiving the 200 OK packet M9, for example, as shown in FIG. 15, the SIP server 3 deletes the Via header for the SIP server 3 from the message header part, and transmits a 200 OK packet M10 to the sending SIP device terminal 5-1 in which the destination IP address and the transmission source IP address of the IP header are rewritten (112). When receiving the 200 OK packet M10, the L3SW 2 transmits a 200 OK packet M11 to the sending SIP device terminal 5-1 in accordance with the routing table (113). When receiving the 200 OK packet M11, the packet transfer device 1 determines the output destination port from the port management table managing the MAC address information, and transfers a 200 OK packet M12 to the sending SIP device terminal 5-1 (114).

When receiving the 200 OK packet M12, the sending SIP device terminal 5-1 transmits, for example, an ACK packet M13 shown in FIG. 16 (115). The ACK packet M13 is received by the packet transfer device 1. When receiving the ACK packet M13, the packet transfer device 1 determines from the value "5060" of the UDP port number that the received packet is for the SIP message, and since the message kind is "ACK" at the start line of the SIP message, an ACK packet M14 is transferred to the uplink port (116). When receiving the ACK packet M14, the L3SW 2 transmits an ACK packet M15 to the SIP sever in accordance with the routing table (117).

When receiving the ACK packet M15, the SIP server 3 specifies the IP address "100.100.1.10" of the receiving SIP device terminal 5-2 from the destination identifier "UserC@aaa.com" indicated by the start line or the To header of the SIP message. For example, as shown in FIG. 17, the SIP server 3 adds to the message header a new Via header so as to add its own server to the message path, and transfers an ACK packet M16 in which the destination address and the transmission source address of the packet M15 are rewritten to the receiving SIP device terminal 5-2 (118). When receiving the ACK packet M16, the L3SW 2 transmits an ACK packet M17 to the receiving SIP device terminal 5-2 in accordance with the routing table (119).

When receiving the ACK packet M17, the packet transfer device 1 determines the output destination port from the port management table 80 managing the MAC address information, and transfers it as an ACK packet M18 to the receiving SIP device terminal 5-2 (120).

Figure 6:
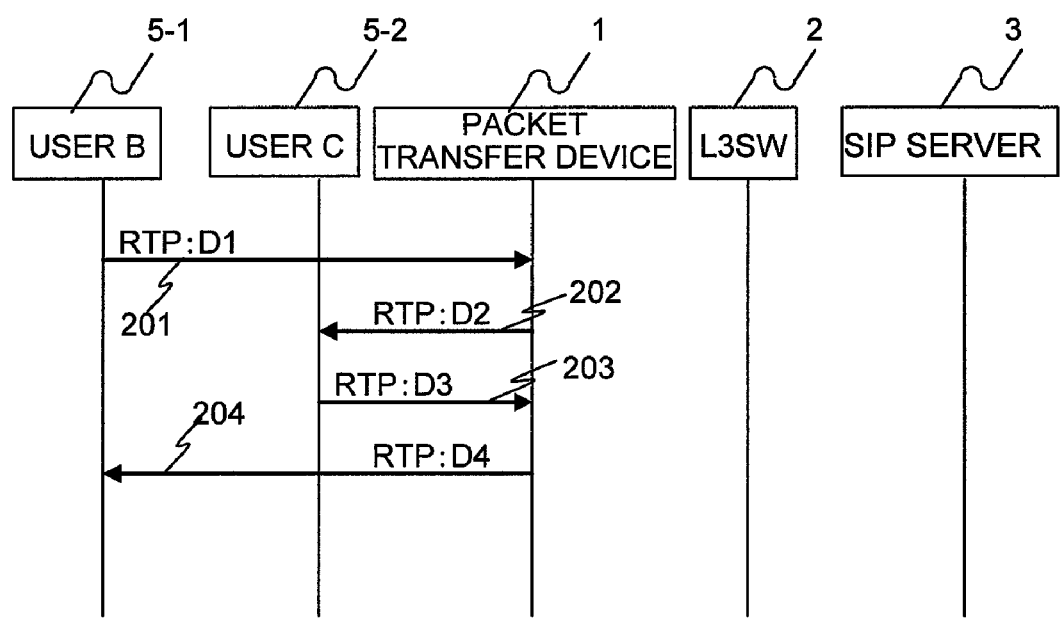
FIG. 6 is a view showing a transfer sequence of RTP packets by the packet transfer device of the embodiment.

FIG. 6 is a view showing a transfer sequence of an RTP packet by the packet transfer device of the embodiment. Next, the transfer sequence of the RTP packet, such as voice data, between the sending SIP device terminal 5-1 and the receiving SIP device terminal 5-2 will be described with reference to FIG. 6.

For example, as shown in FIG. 18, the sending SIP device terminal 5-1 transmits an RTP packet D1 including an IP address "100.100.1.10" of the receiving SIP device terminal 5-2 and a UDP destination port "50070" to the destination IP address (201).

When receiving the RTP packet D1 from the port 1, the packet transfer device 1 searches the user connection management table (port 1) 90-1 for an entry corresponding to the destination IP address "100.100.1.10" of the packet D1. Here, EN2 with high priority is selected. The packet transfer device 1 checks the received packet in accordance with the registration information of the entry. In this case, since the transmission source IP address "100.100.1.1" of the RTP packet D1, the destination port number "50070", and the transmission source port number "50050" satisfy the registration condition indicated by the entry EN2, the packet transfer device 1 loopback transfers an RTP packet D2 to the receiving SIP device terminal 5-2 through the port 2 in accordance with the output port information (202).

On the other hand, for example, as shown in FIG. 19, the receiving SIP device terminal 5-2 transmits an RTP packet D3 including an IP address "100.100.1.1" of the sending SIP device terminal 5-1 and a UDP destination port number "50050" to the destination IP address (203).

When receiving the RTP packet D3 from the port 2, the packet transfer device 1 searches the user connection management table (port 2) 90-2 for an entry corresponding to the destination IP address "100.100.1.1" of the packet D3. Here, the EN2 with high priority is selected. The packet transfer device 1 checks the received packet in accordance with the registration information of the entry. In this case, since the transmission source IP address "100.100.1.10", the destination port number "50050", and the transmission source port number "50070" of the RTP packet D3 satisfy the registration condition indicated by the entry EN2, the packet transfer device 1 loops back an RTP packet D4 to the sending SIP device terminal 5-1 through the port 1 in accordance with the output port information (204). Incidentally, since a packet other than between the sending SIP device terminal 5-1 and the receiving SIP device terminal 5-2 corresponds to the entry EN1 of the user connection management table (port 1) 90-1 and the user connection management table (port 2) 90-2, it is transferred to the uplink port.

Figure 7:
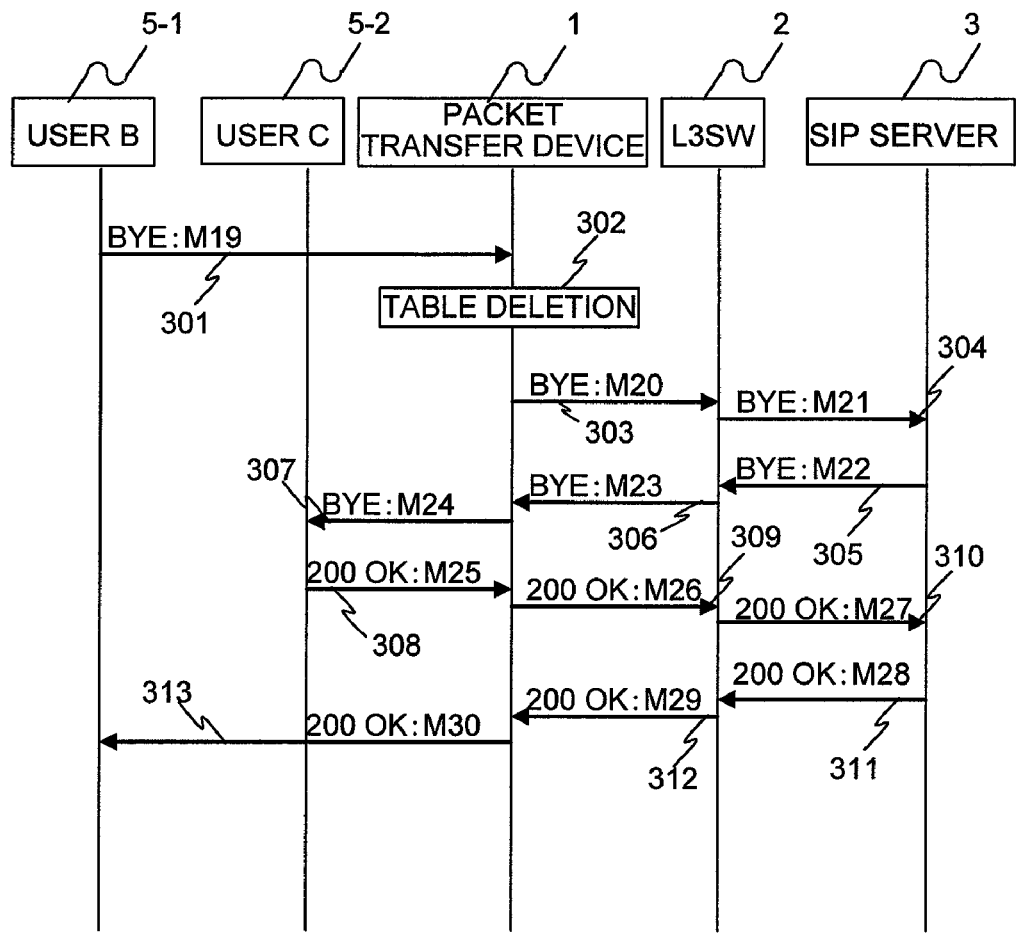
FIG. 7 is a view showing a session disconnection sequence between the sending SIP device terminal 5-1 and the receiving SIP device terminal 5-2.

FIG. 7 is a view showing a session disconnection sequence between the sending SIP device terminal 5-1 and the receiving SIP device terminal 5-2. Next, the sequence of session disconnection and deletion of information from the table will be described with reference to FIG. 7.

For example, in the case where the user of the sending SIP device terminal 5-1 performs a disconnection operation of a session, a BYE packet M19 including a SIP message for session disconnection is transmitted from the sending SIP device terminal 5-1 (301). For example, as shown in FIG. 20, the BYE packet 19 in this case includes an IP header and a UDP header similar to the ACK packet M13, and includes a message kind "BYE" and an IP address "100.100.1.10" of the receiving SIP device terminal 5-2 at the start line of the SIP message. When receiving the BYE packet M19 from the port 1, the packet transfer device 1 determines from the UDP port number that the received packet is for the SIP message. Besides, the packet transfer device 1 snoops the request source identifier indicated by the From header of the message header, and determines whether it coincides with the request source identifier of the sending device terminal information 70A registered in the device management table 70. In the case of coincidence, the entry EN1 is deleted, and the EN2 of the user connection management table (port 1) 90-1 and the EN2 of the user connection management table (port 2) are deleted (302). Based on, for example, the information stored in the entry 1 of the device management table 70, it can be specified whether which entry of the user connection management tables 90-1 and 90-2 is deleted. The packet transfer device 1 transfers a BYE packet M20 to the uplink port in accordance with the EN1 of the user connection management table (port 1) (303).

On the other hand, in the case where the request source identifier indicated by the From header of the message header does not coincide with the request source identifier of the sending device terminal information 70A registered in the device management table 70, for example, in accordance with the EN1 of the user connection management table (port 1), the BYE packet M20 is transferred to the uplink port (303). When receiving the BYE packet M20, the L3SW 2 transmits a BYE packet M21 to the SIP server in accordance with the routing table (304).

When receiving the BYE packet M21, the SIP server 3 specifies the IP address "100.100.1.10" of the receiving SIP device terminal 5-2 from the destination identifier "UserC@aaa.com" indicated by the start line or the To header of the SIP message. Besides, for example, as shown in FIG. 21, the SIP server 3 adds to the message header a new Via header so as to add its own server to a message path, and transfers a BYE packet M22 in which the destination address and the transmission source address of the BYE packet M21 are rewritten to the receiving SIP device terminal 5-2 (305). When receiving the BYE packet M22, the L3SW 2 transmits a BYE packet M23 to the receiving SIP device terminal 5-2 in accordance with the routing table (306). When receiving the BYE packet M23 through the port n, the packet transfer device 1 determines the output destination port from the port management table 80 managing the MAC address information, and transfers a BYE packet M24 to the receiving SIP device terminal 5-2 (307).

When receiving the BYE packet M24, the receiving SIP device terminal 5-2 transmits a 200 OK packet M25 including a SIP response message to the SIP server 3 (308). For example, as shown in FIG. 22, the 200 OK packet M25 indicates the message kind "200 OK" at the start line of the SIP message, and includes, in the message header part, information similar to the BYE packet M24.

The 200 OK packet M25 is received in the port 2 of the packet transfer device 1. When receiving the 200 OK packet M25, the packet transfer device 1 determines from the value "5060" of the UDP port number that the received packet is for the SIP message, and since Cseq 202 of the SIP message is "BYE", it is determined that the 200 OK is to the BYE packet, and a 200 OK packet M26 is transferred to the uplink port (309). When receiving the 200 OK packet M26, the L3SW 2 transmits a 200 OK packet M27 to the SIP server in accordance with the routing table (310).

When the 200 OK packet M27 is received, for example, as shown in FIG. 23, the Via header for the SIP server 3 is deleted from the message header part, and the SIP server 3 transmits a 200 OK packet M28 to the sending SIP device terminal 5-1, in which the destination IP address and the transmission source IP address of the IP header are rewritten (311). When receiving the 200 OK packet M28, the L3SW 2 transmits a 200 OK packet M29 to the sending SIP device terminal 5-1 in accordance with the routing table (312). When receiving the 200 OK packet M29 through the port n, the packet transfer device 1 determines the output destination port from the port management table 80 managing the MAC address information, and transfers it as a 200 OK packet M30 to the sending SIP device terminal 5-1 (313).

Figure 10:
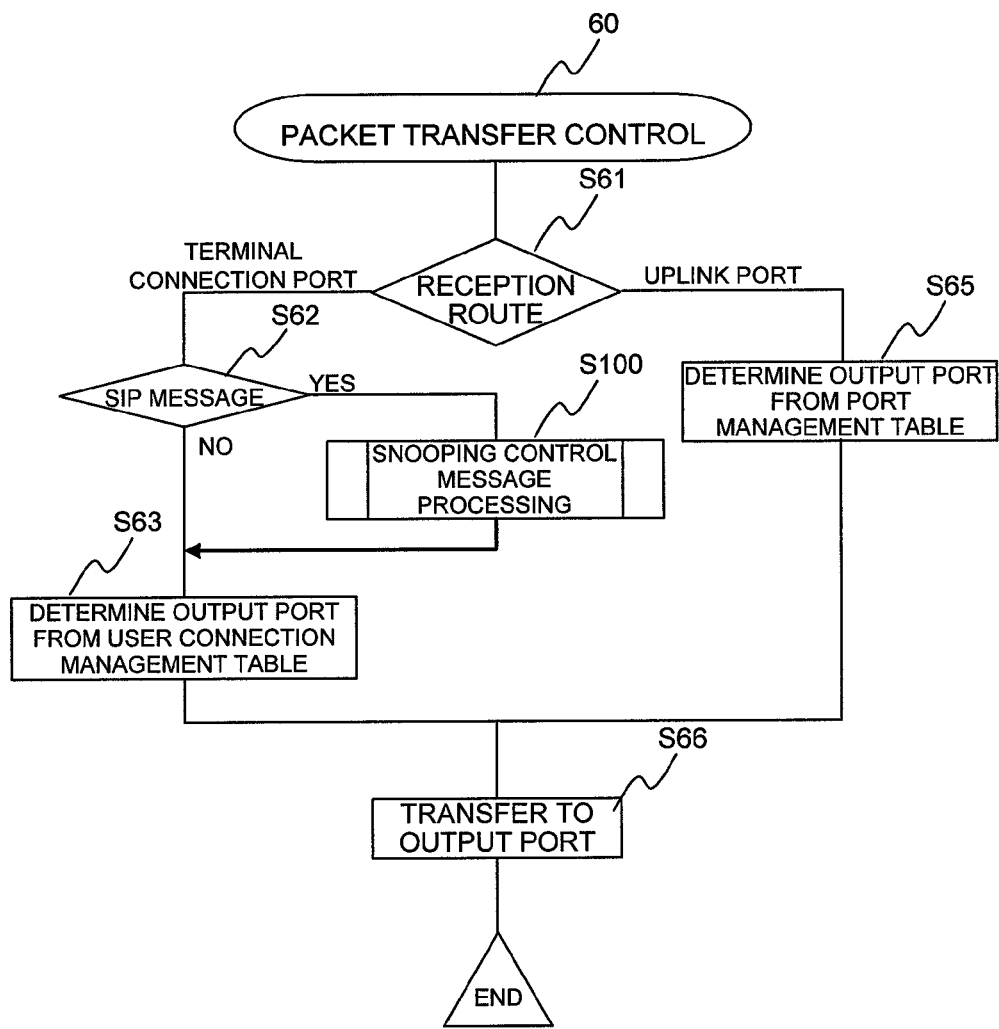
FIG. 10 is a flowchart of a packet transfer control program 60.

FIG. 10 shows a flowchart of a packet transfer control program 60 necessary for realizing a loopback transfer by the packet transfer device 1. For example, the processor 110 of the control unit 40 reads the packet transfer control program 60 stored in the memory 50 and can execute the following processing.

In the packet transfer control program 60, the received packet is read from the protocol processing unit 30, and when the reception route is the reception from the terminal connection port (S61), it is determined whether the received packet is for the SIP message (S62). When the packet is for the SIP (S62), a snooping control message processing is executed (S100). The details of the processing will be described later. On the other hand, when the received packet is not the packet for the SIP (S62), the user connection management table 90 is searched for an entry corresponding to the destination IP address. In the case where the entry exists in the user connection management table 90, the transmission source IP address, the destination port number and the transmission source port number are determined, and the output destination port is determined (S63). In the case where the entry does not exist, the static set uplink port is determined to be the output destination port (S63). When the output destination port is determined, the received packet is transferred to the output port (S66).

On the other hand, when the reception route is the reception from the uplink port (S61), the output destination port is determined from the port management table 80 managing the MAC address information (S65), and when the output destination port is determined, the received packet is transferred to the output port (S66).

Figure 11:
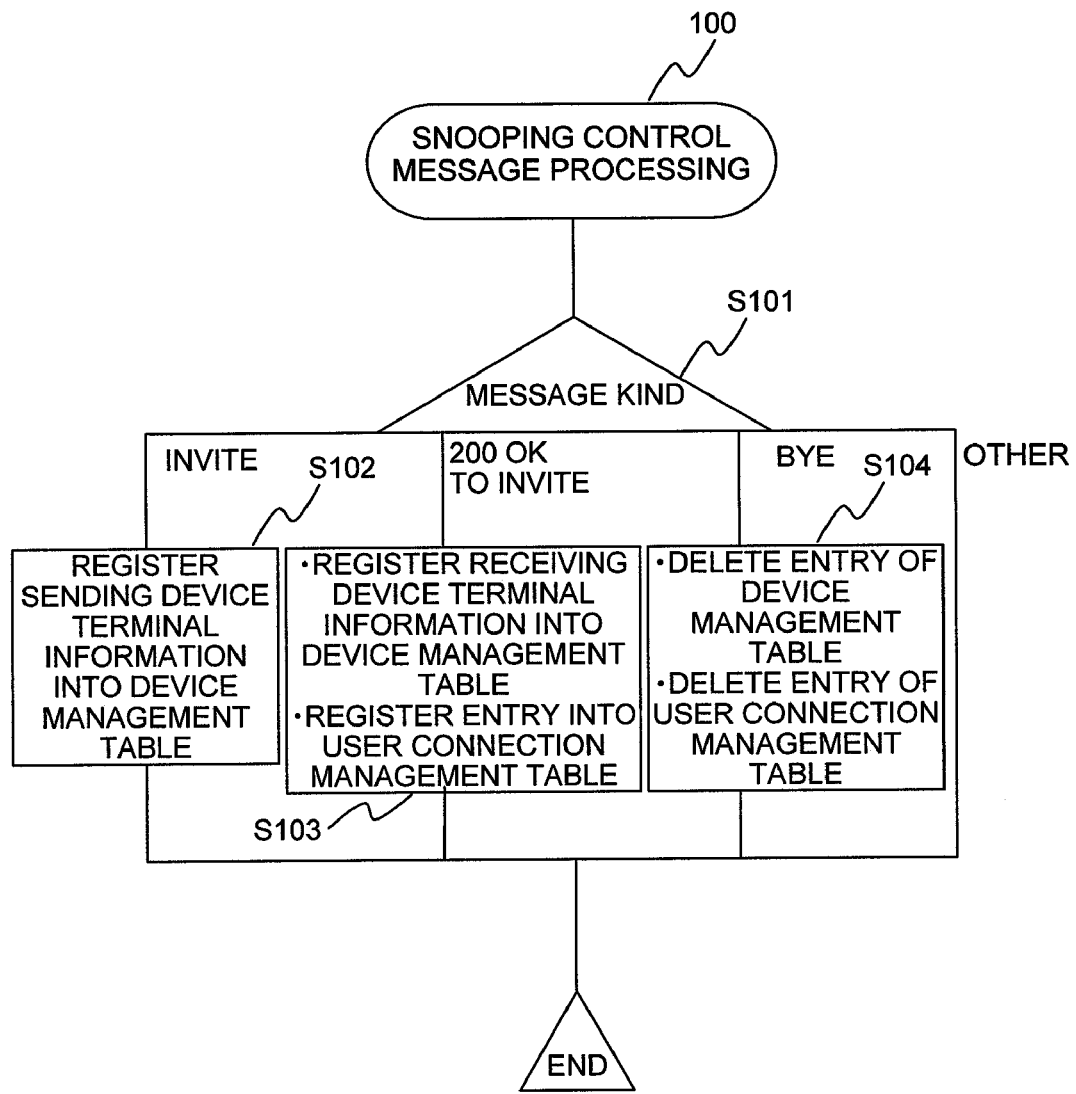
FIG. 11 is a flowchart of a SIP snooping control message processing program 100.

FIG. 11 shows the details of a snooping control message processing 100.

In the snooping control message processing 100, the message kind of the SIP message included in the received packet is determined (S101).

In the case where the received message is, for example, the INVITE message (S101), the packet transfer device 1 entry-registers the sending device terminal information in which the sending IP address specified in the message header of the SIP message, the sending port number and the connection port number are made to correspond to each other into the device management table 70 (S102).

In the case where the received message is the 200 OK packet M25 (S101), when the method name of Cseq (Command sequence) specified in the message header of the SIP message is INVITE 201, it is determined that the 200 OK message is to the INVITE message, and the processing of step S103 is executed. For example, the packet transfer device 1 entry-registers the receiving device terminal information in which the receiving IP address, the receiving port number and the connection port number are made to correspond to each other into the device management table 70 (S103). Besides, the entry indicating the relation among the destination address to determine the output destination port, the transmission source address, the destination port number, the transmission source port number, the output destination port, and the priority are registered into the user connection management table 90 storing them in connection port units (S103).

In the case where the received message is, for example, the BYE message (S101), the entry having the request source identifier specified in the message header of the SIP message is deleted from the device management table 70, and the relevant entry of the user connection management table is deleted (S104).

In the case where the reception message is the 200 OK to BYE or another message, or a packet (S101), a shift is made to a next processing (S63).

(Processing Example in Multistage Structure)

In the above description, although the description has been made on the example in which the terminals 5-1 and 5-2 are connected to the one packet transfer device 1, for example, also in the case where the packet transfer devices 1 are connected in a multistage configuration as shown in FIG. 1, each packet transfer device performs a processing as described above, so that the loopback transfer by the packet transfer device can be performed.

Hereinafter, the processing of the case of a connection in two stages as shown in FIG. 1 will be described. In this example, for convenience of the description, the description will be made on the assumption that the sending SIP device terminal 5-1 is connected to the port 1 of the packet transfer device 1-1, and the receiving SIP device terminal 5-2 is connected to the port 2 (for example, the position of UserE) of the packet transfer device 1-2. Besides, in this example, it is assumed that the port 1 of the packet transfer device 1-3 is connected to the packet transfer device 1-1, the port 2 is connected to the packet transfer device 1-3, and the port n is connected to the L3SW 2.

FIGS. 24A and 24B and FIGS. 25A to 25D show examples of the device management table 70 and the user connection management table 90 in the packet transfer devices connected in the multistage manner.

The INVITE packet from the sending SIP device terminal 5-1 is received by the port 1 of the packet transfer device 1-1. Similarly to the processing 102, the packet transfer device 1-1 registers the information indicating the correspondence relation among the IP address "100.100.1.1" of the sending SIP device terminal 5-1, the port number "50050" for data reception, and the identification information of the packet received device port (port 1) into the sending device terminal information of the device management table 70. FIG. 24A shows an example of the device management table of the packet transfer device 1-1. Besides, the packet transfer device 1-1 transfers the INVITE packet to the packet transfer device 1-3 through the uplink port n.

The packet transfer device 1-3 receives the INVITE packet in the port 1, and similarly to the processing 102, registers the IP address of the sending SIP device terminal 5-1, the port number for data reception, and the identification information of the packet received device port (port 1) into the sending device terminal information of the device management table 70. FIG. 25A shows an example of the device management table of the packet transfer device 1-3. Similarly to the above, the INVITE packet is received by the receiving SIP device terminal 5-2 through the SIP server.

Similarly to the processing 108, the receiving SIP device terminal 5-2 transmits the 200 OK packet including the SIP response message to the SIP server 3. The 200 OK packet is received in the port 2 of the packet transfer device 1-2. The packet transfer device 1-2 snoops the request source identifier indicated by the From header of the message header, and determines whether it coincides with the request source identifier of the sending device terminal information 70A registered in the device management table 70. Here, as shown in FIG. 24B, since the sending device terminal information is not registered in the device management table 70 of the packet transfer device 1-2, the 200 OK packet is transferred to the packet transfer device 1-3 through the port n.

The 200 OK packet is received in the port 2 of the packet transfer device 1-3. The packet transfer device 1-3 snoops the request source identifier indicated by the From header of the message header, and determines whether it coincides with the request source identifier of the sending device terminal information 70A registered in the device management table 70. Here, as shown in FIG. 25A, since there exists the sending device terminal information in which the request source identifier coincides, similarly to the processing 109, the packet transfer device 1-3 registers the IP address of the receiving SIP device terminal 5-2, the port number, and the identification information of the packet received device port (port 2) in the receiving device terminal information 70B and in the EN1 of the device management table 70 (FIG. 25B). Besides, since the sending device terminal information 70A and the receiving device terminal information 70B are registered in the device management table 70, similarly to the above, the packet transfer device 1-3 registers the information 70A and 70B into the user connection management tables 90-1 and 90-2 (FIGS. 25C, 25D).

On the other hand, in the packet transfer device 1-1, since the 200 OK packet to the INVITE packet is not received from the port at the terminal side, the device management table 70 remains as shown in FIG. 24A. Since the receiving device terminal information 70B is not registered, new information is not registered in the user connection management table.

As described above, in the packet transfer devices 1-1 and 1-2, since information is not registered in the user connection management table, in accordance with the uplink VLAN setting, the packet received from the port 1 and the port 2 at the terminal side is transferred to the uplink port n. On the other hand, in the packet transfer device 1-3, as shown in FIGS. 25C and 25D, since information is registered in the user management table, the packet between the sending SIP device terminal 5-1 and the receiving SIP device terminal 5-2 is loopback transferred by the packet transfer device 1-3 and communication can be made.

As described above, the multistage-connected network can be constructed using the packet transfer devices having similar operation programs.
(Structural Example of Network)

Figure 26:
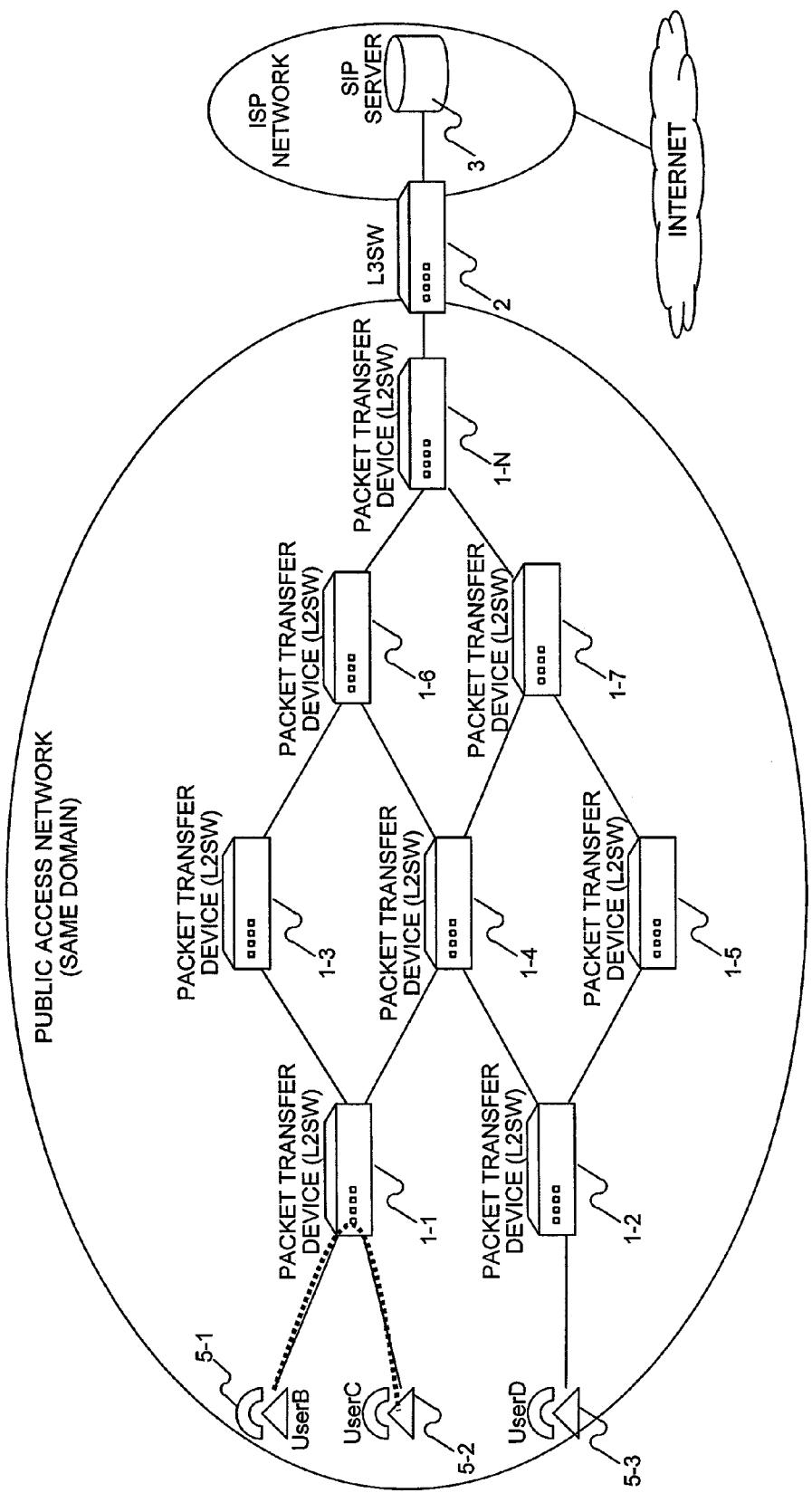
FIG. 26 is a view showing an example of a communication network in which the packet transfer device of the invention is applied to a large-scale network.

FIG. 26 shows an example of VOIP communication in a wide area L2 switch network (public access network) in which the packet transfer devices 1 each having the snooping function are constructed in a multistage configuration.

In the case where the whole network is considered, since the loopback transfer can be performed in the lower-level network, the traffic resource of the whole network and the transfer delay time are reduced, and the congestion of the L3SW 2 is relieved, which are effective.

The invention can be used for, for example, a communication system in which uplink VLAN setting is performed. Besides, the invention can be used for an access network having the same domain.

What is claimed is:

1. A packet transfer device which is a first packet transfer device in a communication system that includes the first packet transfer device and a second packet transfer device, wherein the first packet transfer device is a layer 2 switch and is set to an uplink VLAN setting, and the second packet transfer device is a layer 3 switch and performs routing of a packet between the first packet transfer device and a server or a network, wherein the first packet transfer device has a first port for communicating with a first terminal, a second port for communicating with a second terminal, and a third port for communicating with the second packet transfer device, the packet inputted from the first port and the second port is fixedly transferred to the third port according to the uplink VLAN setting, the first packet transfer device transfers the packet received from the first terminal through the first port and the packet received from the second terminal through the second port to the third port in accordance with the uplink VLAN setting, the first packet transfer device transfers the packet received from the second packet transfer device through the third port to either one of the first port and the second port in accordance with destination information of the packet, and communication between the first terminal and the second terminal is realized through the first and the second packet transfer devices, the packet transfer device which is the first packet transfer device comprising:

a device management table to correspondingly store sending terminal information including identification information of the first terminal and identification information of the first port, and receiving terminal information including identification information of the second terminal and identification information of the second port;

a connection management table to store output port information corresponding to transmission source information and transmission destination information of a packet; and a processing unit which snoops SIP (Session Initiation Protocol) messages, wherein the processing unit registers, in a case where a session establishment request of a SIP message from the first terminal is received through the first port, the identification information of the first terminal in the session establishment request packet and the identification information of the first port into the sending terminal information of the device management table by snooping the session establishment request packet, registers, in a case where a response packet of the SIP message to the session establishment request packet is received from the second terminal through the second port, the identification information of the second terminal in the response packet and the identification information of the second port into the receiving terminal information of the device management table correspondingly to the sending terminal information by snooping the response packet, registers into the connection management table the identification information of the first terminal registered in the device management table as transmission source information, the identification information of the second terminal as transmission destination information, and the second port information as output destination port information, registers into the connection management table the identification information of the second terminal registered in the device management table as transmission source information, the identification information of the first terminal as transmission destination information, and the first port information as output destination port information, searches, when a packet is received from the first or the second port, the connection management table based on transmission source information and transmission destination information of the received packet, transfers, in a case where the transmission source information and the destination information of the received packet are registered in the connection management table, the received packet through the second or the first port in accordance with corresponding output port information, and transfers, in a case where the transmission source information and the destination information of the received packet are not registered in the connection management table or in a case where the output port information of the connection management table indicates the third port, the received packet to the second packet transfer device through the third port in accordance with the uplink VLAN setting, wherein a SIP protocol is used as a protocol for session control, an INVITE packet as the session establishment request packet, a 200 OK packet to the INVITE packet as the response packet, and a BYE message as the session disconnection request packet are respectively snooped, and snooped information is registered in the device management table in advance and then, the information registered in the device management table is registered into the connection management table.

2. The packet transfer device according to claim 1, wherein the sending terminal information registered in the device management table includes one of or plural of an IP address of the first terminal, a port number of a UDP, and a number of the first port, the receiving terminal information includes one of or plural of an IP address of the second terminal, a port number of a UDP, and a number of the second port, and the processing unit registers the IP address of the first terminal in the session establishment request packet, the port number of the UDP, the number of the first port having received the session establishment request packet into the sending terminal information of the device management table, and registers the IP address of the second terminal in the response packet to the session establishment request packet, the port number of the UDP, and the number of the second port having received the response packet into the receiving terminal information of the device management table.

3. The packet transfer device according to claim 1, wherein the information registered in the connection management table includes one of or plural of a transmission destination IP address, a transmission source IP address, a transmission destination port number of a UDP, a transmission source port number of a UDP, and an output port number of a packet received through the first or the second port.

4. The packet transfer device according to claim 1, wherein when a session disconnection request packet is received from the first or the second terminal, based on identification information of a transmission source of the received packet, the transmission source information and the transmission destination information in the connection management table are retrieved and a coincident entry is deleted, and based on the identification information of the transmission source of the received packet, the identification information of the first terminal and the identification information of the second terminal in the device management table are retrieved, and a coincident entry is deleted.

5. The packet transfer device according to claim 1, wherein priority information is further registered in the connection management table, in the first and the second port, in a case where congestion occurs by a packet transferred from the second or the first port and a packet transferred from the third port, the packet transferred from the second or the first port is transferred preferentially in accordance with the priority information.

6. A communication system comprising a plurality of the first packet transfer devices each of which is the packet transfer device according to claim 1, wherein the respective packet transfer devices are connected in a multistage configuration, and at least one of the plural packet transfer devices is connected to the second packet transfer device.

7. A communication system comprising:

a first packet transfer device which is a layer 2 switch and is set to an uplink VLAN setting; and a second packet transfer device which is a layer 3 switch and performs routing of a packet between the first packet transfer device and a server or a network;

wherein the first packet transfer device communicates with the server or the network through the second packet transfer device, the first packet transfer device transfers a packet inputted from a first port for communicating with a first terminal and/or a second port for communicating with a second terminal to a third port for communicating with the second packet transfer device in accordance with the uplink VLAN setting, the second packet transfer device receives the packet and returns the packet to the first packet transfer device, the first packet transfer device transfers the packet from the second packet transfer device in accordance with destination information, and communication between the first terminal and the second terminal is realized; and wherein the first packet transfer device includes
- a device management table to correspondingly store sending terminal information including identification information of the first terminal and identification information of the first port, and receiving terminal information including identification information of the second terminal and identification information of the second port;
- a connection management table to store output port information corresponding to transmission source information and transmission destination information of a packet; and
- a processing unit which snoops SIP (Session Initiation Protocol) messages;

wherein the processing unit registers, in a case where a session establishment request of a SIP message from the first terminal is received through the first port, the identification information of the first terminal in the session establishment request packet and the identification information of the first port into the sending terminal information of the device management table by snooping the session establishment request packet;

wherein the processing unit registers, in a case where a response packet of the SIP message to the session establishment request packet is received from the second terminal through the second port, the identification information of the second terminal in the response packet and the identification information of the second port into the receiving terminal information of the device management table correspondingly to the sending terminal information by snooping the response packet;

wherein the processing unit registers into the connection management table the identification information of the first terminal registered in the device management table as transmission source information, the identification information of the second terminal as transmission destination information, and the second port information as output destination port information;

wherein the processing unit registers into the connection management table the identification information of the second terminal registered in the device management table as transmission source information, the identification information of the first terminal as transmission destination information, and the first port information as output destination port information;

wherein the processing unit searches, when a packet is received from the first or the second port, the connection management table based on transmission source information and transmission destination information of the received packet;

wherein the processing unit transfers, in a case where the transmission source information and the destination information of the received packet are registered in the connection management table, the received packet through the second or the first port in accordance with corresponding output port information; and wherein the processing unit transfers, in a case where the transmission source information and the destination information of the received packet are not registered in the connection management table or in a case where the output port information of the connection management table indicates the third port, the received packet to the second packet transfer device through the third port in accordance with the uplink VLAN setting, wherein
a SIP protocol is used a as a protocol for session control, an INVITE packet as the session establishment request packet, a 200 OK packet to the INVITE packet as the response packet, and a BYE message as the session disconnection request packet are respectively snooped, and snooped information is registered in the device management table in advance and then, the information registered in the device management table is registered into the connection management table.

8. The communication system according to claim 7, wherein
the sending terminal information registered in the device management table includes one of or plural of an IP address of the first terminal, a port number of a UDP, and a number of the first port, the receiving terminal information includes one of or plural of an IP address of the second terminal, a port number of a UDP, and a number of the second port, and the processing unit
registers the IP address of the first terminal in the session establishment request packet, the port number of the UDP, the number of the first port having received the session establishment request packet into the sending terminal information of the device management table, and registers the IP address of the second terminal in the response packet to the session establishment request packet, the port number of the UDP, and the number of the second port having received the response packet into the receiving terminal information of the device management table.

9. The communication system according to claim 7, wherein
the information registered in the connection management table includes one of or plural of a transmission destination IP address, a transmission source IP address, a transmission destination port number of a UDP, a transmission source port number of a UDP, and an output port number of a packet received through the first or the second port.

10. The communication system according to claim 7, wherein
when a session disconnection request packet is received from the first or the second terminal, based on identification information of a transmission source of the received packet, the transmission source information and the transmission destination information in the connection management table are retrieved and a coincident entry is deleted, and based on the identification information of the transmission source of the received packet, the identification information of the first terminal and the identification information of the second terminal in the device management table are retrieved, and a coincident entry is deleted.

11. The communication system according to claim 7, wherein
priority information is further registered in the connection management table,
in the first and the second port, in a case where congestion occurs by a packet transferred from the second or the first port and a packet transferred from the third port, the packet transferred from the second or the first port is transferred preferentially in accordance with the priority information.

12. A communication system according to claim 7, comprising a plurality of the first packet transfer devices; wherein the plurality of first packet transfer devices are connected in a multistage configuration, and at least one of the plurality of first packet transfer devices is connected to the second packet transfer device.

* * * * *